US007630463B2

(12) United States Patent
Shin et al.

(10) Patent No.: US 7,630,463 B2
(45) Date of Patent: Dec. 8, 2009

(54) APPARATUS AND METHOD FOR ACQUIRING SYNCHRONIZATION IN MOBILE COMMUNICATION SYSTEM USING OFDM SCHEME

(75) Inventors: Won-Yong Shin, Yongin-si (KR);
Young-Ho Jung, Yongin-si (KR);
Chan-Soo Hwang, Yongin-si (KR);
Yong-Hoon Lee, Daejeon (KR);
Jin-Gon Joung, Seoul (KR)

(73) Assignees: Samsung Electronics Co., Ltd. (KR);
Korea Advanced Institute of Science & Technology (KR)

( * ) Notice: Subject to any disclaimer, the term of this patent is extended or adjusted under 35 U.S.C. 154(b) by 773 days.

(21) Appl. No.: 11/274,577

(22) Filed: Nov. 15, 2005

(65) Prior Publication Data
US 2006/0104254 A1 May 18, 2006

(30) Foreign Application Priority Data
Nov. 15, 2004 (KR) .................. 10-2004-0093268

(51) Int. Cl.
*H01L 27/06* (2006.01)
*H01L 27/00* (2006.01)
(52) U.S. Cl. .................. 375/344; 375/260; 375/316; 375/324; 375/326; 375/346
(58) Field of Classification Search .................. 375/260, 375/295, 316, 324–327, 344, 346
See application file for complete search history.

(56) References Cited

U.S. PATENT DOCUMENTS

| | | | | |
|---|---|---|---|---|
| 5,953,311 A * | 9/1999 | Davies et al. | ............... | 370/210 |
| 6,618,452 B1 * | 9/2003 | Huber et al. | ............... | 375/343 |
| 6,658,063 B1 * | 12/2003 | Mizoguchi et al. | .......... | 375/260 |
| 6,678,339 B1 * | 1/2004 | Lashkarian | .................. | 375/341 |
| 6,922,388 B1 * | 7/2005 | Laroia et al. | ................. | 370/208 |
| 6,961,393 B1 * | 11/2005 | Cupo et al. | .................. | 375/343 |
| 7,012,881 B2 * | 3/2006 | Kim | ........................... | 370/208 |
| 7,027,543 B1 * | 4/2006 | Lashkarian | ................. | 375/355 |
| 7,133,474 B2 * | 11/2006 | Ramasubramanian et al. | .... | 375/343 |
| 7,203,252 B2 * | 4/2007 | Lashkarian | ................. | 375/324 |
| 7,286,514 B2 * | 10/2007 | Bar-Ness et al. | ............. | 370/338 |

(Continued)

OTHER PUBLICATIONS

Van de Beek et al., ML Estimation of Timing and Frequency Offset in Multicarrier Systems, Apr. 1996.

(Continued)

*Primary Examiner*—Jason M. Perilla
(74) *Attorney, Agent, or Firm*—The Farrell Law Firm, LLP

(57) ABSTRACT

Disclosed is a method for acquiring synchronization in a mobile communication system using an Orthogonal Frequency Division Multiplexing (OFDM) scheme. The method includes modeling a power delay profile in time-varying frequency selective fading channel conditions by a specific function; detecting a log probability distribution function of a timing offset and a frequency offset in consideration of a correlation between a received signal and the received multipath signal in the time-varying frequency selective fading channel conditions having the power delay profile modeled as the specific function; and estimating a timing offset and a frequency offset which maximize the log probability distribution function of the timing offset and the frequency offset.

16 Claims, 5 Drawing Sheets

U.S. PATENT DOCUMENTS

| | | | |
|---|---|---|---|
| 7,301,890 B2 * | 11/2007 | Joo et al. | 370/208 |
| 7,310,393 B2 * | 12/2007 | Sheu et al. | 375/348 |
| 7,349,483 B2 * | 3/2008 | Seki et al. | 375/260 |
| 7,352,778 B2 * | 4/2008 | Labs et al. | 370/503 |
| 7,415,059 B2 * | 8/2008 | Chadha et al. | 375/343 |
| 7,460,610 B2 * | 12/2008 | Matsumoto | 375/285 |
| 7,480,234 B1 * | 1/2009 | Hart et al. | 370/208 |
| 7,483,366 B2 * | 1/2009 | Joo et al. | 370/208 |
| 2003/0179813 A1 * | 9/2003 | Morita et al. | 375/148 |
| 2004/0170197 A1 * | 9/2004 | Mehta | 370/504 |
| 2004/0208254 A1 * | 10/2004 | Lee et al. | 375/260 |
| 2004/0223554 A1 * | 11/2004 | Cha | 375/260 |
| 2005/0105659 A1 * | 5/2005 | Sheu et al. | 375/360 |
| 2005/0147024 A1 * | 7/2005 | Jung et al. | 370/203 |
| 2005/0265439 A1 * | 12/2005 | Matsumura et al. | 375/232 |
| 2005/0271175 A1 * | 12/2005 | Lashkarian | 375/355 |
| 2006/0104254 A1 * | 5/2006 | Shin et al. | 370/343 |
| 2007/0036234 A1 * | 2/2007 | Chen et al. | 375/260 |
| 2008/0043858 A1 * | 2/2008 | Lim et al. | 375/260 |
| 2009/0028042 A1 * | 1/2009 | Chin et al. | 370/203 |

OTHER PUBLICATIONS

Muller, A Random Matrix Model for the Antenna Array Channel with Decaying Power Delay Profile, Information Theory Workshop, Sep. 2-7, 2001.

Roy et al., Ultrawideband Radio Design: The Promise of High-Speed, Short-Range Wireless Connectivity, Proceeding of the IEEE, Feb. 2004.

* cited by examiner

APPARATUS AND METHOD FOR ACQUIRING SYNCHRONIZATION IN MOBILE COMMUNICATION SYSTEM USING OFDM SCHEME

PRIORITY

This application claims priority under 35 U.S.C. §119 to an application entitled "Apparatus And Method For Acquiring Synchronization In Mobile Communication System Using OFDM Scheme" filed in the Korean Intellectual Property Office on Nov. 15, 2004 and assigned Serial No. 2004-93268, the contents of which are incorporated herein by reference.

BACKGROUND OF THE INVENTION

1. Field of the Invention

The present invention relates to a mobile communication system using an Orthogonal Frequency Division Multiplexing (OFDM) scheme, which will be referred to as an OFDM mobile communication system, and more particularly to an apparatus and a method for acquiring synchronization in time-varying frequency selective fading channel conditions.

2. Description of the Related Art

In a $4^{th}$ generation (4G) mobile communication system, which is the next generation communication system, research has been actively pursued to provide users with services having various qualities of service (QoS) at high transmission speed. Specifically, in the current 4G mobile communication system, research is being carried out to support a high speed service capable of ensuring mobility and QoS in a Broadband Wireless Access (BWA) communication system such as a wireless Local Area Network (LAN) communication system and a wireless Metropolitan Area Network (MAN) communication system.

In the 4G mobile communication system, an OFDM scheme has been actively researched as a scheme available for transmitting data through wire and wireless channels at a high speed. The OFDM scheme, which transmits data using multi-carriers, is a special type of a Multi-Carrier Modulation (MCM) scheme in which a serial input symbol sequence is converted into parallel symbol sequences and the parallel symbol sequences are modulated with a plurality of mutually orthogonal sub-carriers before being transmitted.

The 4G mobile communication system requires broadband spectrum resources in order to provide a wireless multimedia service of high quality at high speed. However, when the broadband spectrum resources are used, a fading influence on a wireless transmission channel may be serious due to a multi-path propagation, and a further influence due to frequency selective fading may occur in a transmission band. Accordingly, for a high speed wireless multimedia service, because an OFDM scheme tolerant to frequency selective fading has larger gain as compared with a Code Division Multiple Access (CDMA) scheme, the OFDM scheme has been widely applied to the 4G communication system.

Usually, a mobile communication system supports a mobile communication service by means of frames between a Base Station (BS) and a Mobile Subscriber Station (MSS). Accordingly, the BS and the MSS must acquire mutual synchronization for transmission/reception of frames. In order to achieve synchronization, the BS transmits synchronization signals to the MSS so that the MSS can recognize the start of a frame transmitted from the BS. Then, the MSS receives the synchronization signals transmitted from the BS, checks a frame timing of the BS, and demodulates frames received based on the checked frame timing. Usually, in the synchronization signals, a training sequence stipulated in advance by the BS and the MSS is used.

Hereinafter, operations of a transmitter and a receiver in the OFDM mobile communication system will be briefly described. For convenience of description, it is assumed that the transmitter of the OFDM mobile communication system is a BS and the receiver of the OFDM mobile communication system is a MSS.

In the BS, input data are modulated with sub-carriers through a scrambler, an encoder and an interleaver. The BS provides various variable data rates. Different coding rates, interleaving sizes and modulation schemes may be obtained according to the data rates. Typically, the encoder uses a coding rate of ½, ¾, etc., and the interleaver has sizes determined according to the Number of Coded Bits per OFDM Symbol (NCBOS) in order to prevent burst errors from occurring. The modulation scheme may use a Quadrature Phase Shift Keying (QPSK) scheme, an 8 PSK scheme; a 16 Quadrature Amplitude Modulation (QAM) scheme, a 64 QAM scheme, etc., according to the data rates.

A predetermined number of pilot sub-carriers are added to the signals modulated with the predetermined number of sub-carriers by the afore-described construction, and the signals pass through an Inverse Fast Fourier Transform (IFFT) unit to generate one OFDM symbol. Then, guard interval signals are inserted into the OFDM symbol in order to remove Inter-Symbol Interference (ISI) in multi-path channel conditions, and the OFDM symbol passes through a symbol waveform generator. Finally, the OFDM symbol is input to a Radio Frequency (RF) processor, and the RF processor processes the OFDM symbol and transmits the processed OFDM symbol to the air.

The guard interval signals are inserted when the OFDM symbol is transmitted in order to remove the ISI between an OFDM symbol transmitted at a previous OFDM symbol time and a current OFDM symbol being transmitted at a current OFDM symbol time. Further, the guard interval signals are inserted by one of a 'cyclic prefix' scheme, in which predetermined last samples of an OFDM symbol on a time domain are copied and inserted into an effective OFDM symbol.

The MSS corresponding to the BS as described above performs a process inverse to that performed by the BS, and a synchronization acquisition process is additionally performed. First, a process for acquiring synchronization by means of a training symbol or guard interval signals having been preset for a received OFDM symbol must be performed in advance. The process for acquiring the synchronization represents a process for estimating a frequency offset and a timing offset, i.e., a symbol timing offset, and the training symbol represents a symbol for transmitting a training sequence.

Then, a data symbol, excluding guard interval signals, passes through a Fast Fourier Transform (FFT) unit and is restored to the sub-carrier signals including the predetermined number of pilot sub-carriers. Further, in order to overcome a path delay on actual mobile communication channels, an equalizer estimates channel conditions for received channel signals and removes signal distortion on the actual mobile communication channels from the received channel signals. The data, for which the channel conditions have been estimated by passing through the equalizer, are converted into bit sequences, pass through a deinterleaver, and are then outputted as final data via a decoder and descrambler for error correction.

As described above, the BS transmits pilot sub-carrier signals to the MSS. The BS transmits data sub-carrier signals and simultaneously transmits the pilot sub-carrier signals to the MSS. The reason for transmitting the pilot sub-carrier signals is for synchronization acquisition, channel estimation, and BS identification. The pilot sub-carrier signals operate as the training symbol in order to allow the channel estimation to be performed between the transmitter and the receiver. The MSS can identify a BS including the MSS by means of the pilot sub-carrier signals. The position, to which the pilot sub-carrier signals are transmitted, has been stipulated in advance between the BS and the MSS.

In the OFDM mobile communication system as described above, the frequency offset and the timing offset are estimated using the training symbol or the guard interval signals. A scheme for estimating the frequency offset and the timing offset by means of the training symbol has a problem in that a loss of data transmission efficiency is unavoidable because the training symbol must be transmitted in order to estimate the frequency offset and the timing offset.

A scheme for estimating the frequency offset and the timing offset by means of the guard interval signals has a low frequency and timing offset estimation capability, as compared with the scheme for estimating the frequency offset and the timing offset by means of the training symbol. However, with use of the guard interval signals for estimation it is not needed to transmit the training symbol in order to estimate the frequency offset and the timing offset, so that frequency offset and timing offset can be estimated by a relatively simple operation without a loss of data transmission efficiency.

As described above, because the OFDM mobile communication system uses the broadband spectrum, the fading influence on the wireless transmission channel may be serious due to the multi-path propagation, and a further adverse influence due to the frequency selective fading may occur in the transmission band. While the OFDM scheme is tolerant to frequency selective fading as compared with the CDMA scheme, etc., but the time-varying frequency selective fading functions as a significant factor determining the total capacity of the OFDM mobile communication system.

However, the currently used scheme for estimating the frequency offset and the timing offset by means of the guard interval signals has a problem in that it is difficult to directly apply the scheme to the OFDM mobile communication system, including time-varying frequency selective fading channel conditions, because the scheme models received signals in Additive White Gaussian Noise (AWGN) or time-varying flat fading channel conditions.

SUMMARY OF THE INVENTION

Accordingly, the present invention has been made to solve the above-mentioned problems occurring in the prior art, and it is an object of the present invention to provide an apparatus and a method for acquiring synchronization in an OFDM mobile communication system.

It is another object of the present invention to provide an apparatus and a method for acquiring synchronization in an OFDM mobile communication system, which has minimum complexity, by taking time-varying frequency selective fading channel conditions into consideration.

In order to accomplish the aforementioned objects, according to one aspect of the present, there is provided a method for acquiring synchronization in a receiver of a mobile communication system using an Orthogonal Frequency Division Multiple (OFDM) scheme. The method includes modeling a power delay profile in time-varying frequency selective fading channel conditions by a specific function; when a signal is received, detecting a log probability distribution function of a timing offset and a frequency offset in consideration of a correlation between the received signal and received multi-path signal in the time-varying frequency selective fading channel conditions having the power delay profile modeled as the specific function; and estimating a timing offset and a frequency offset which maximize the log probability distribution function of the timing offset and the frequency offset.

In order to accomplish the aforementioned objects, according to another aspect of the present, there is provided an apparatus for acquiring synchronization in a receiver of a mobile communication system using an Orthogonal Frequency Division Multiplexing (OFDM) scheme. The apparatus includes a receiver for receiving a Radio Frequency (RF) signal, converting the received RF signal to a baseband signal, and performing a Fast Fourier Transform (FFT) for the baseband signal; and a synchronization acquisition unit for inputting the signal for which the FFT has been performed, detecting a log probability distribution function of a timing offset and a frequency offset in consideration of a correlation between the received signal and received multi-path signal in time-varying frequency selective fading channel conditions, and estimating a timing offset and a frequency offset which maximize the log probability distribution function of the timing offset and the frequency offset.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

A preferred embodiment of the present invention will be described in detail herein with reference to the accompanying drawings. In the following description, a detailed description of known functions and configurations incorporated herein will be omitted when it may obscure the subject matter of the present invention.

The present invention proposes an apparatus and a method for acquiring synchronization in a mobile communication system using an Orthogonal Frequency Division Multiplexing (OFDM) scheme, which will be referred to as an OFDM mobile communication system. The synchronization acquisition represents estimating a frequency offset and a timing offset, i.e., a symbol timing offset. In particular, the present invention proposes an apparatus and a method for acquiring synchronization by means of guard interval signals in an OFDM mobile communication system including time-varying frequency selective fading channel conditions. Further, the present invention proposes an apparatus and a method for acquiring synchronization even without separate channel estimation by means of correlation between received signals and guard interval signals. Hereinafter, in describing the present invention, the power profile of a time-varying frequency selective fading channel is modeled by an $\alpha$-function. Further, because the $\alpha$-function will be described in detail, the detailed description will be omitted here.

Figure 1:
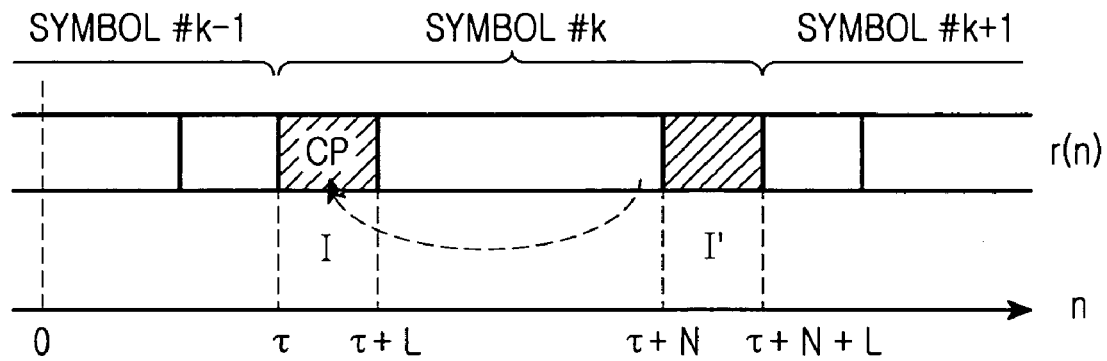
FIG. 1 is a diagram illustrating an OFDM symbol structure on a time domain in an OFDM mobile communication system.

Before the present invention is described, an OFDM symbol structure on a time domain will be described. FIG. 1 is a diagram illustrating the OFDM symbol structure on the time domain in an OFDM mobile communication system.

Before describing FIG. 1, in the OFDM mobile communication system, guard interval signals are inserted by one of a 'cyclic prefix' scheme, in which predetermined last samples of an OFDM symbol on the time domain are copied and inserted into an effective OFDM symbol. FIG. 1 shows the OFDM symbol structure when the guard interval signals are generated using the cyclic prefix scheme. That is, FIG. 1 shows the OFDM symbol structure into which the guard interval signals are inserted by means of the cyclic prefix scheme in which the predetermined last samples 'I' of the effective OFDM symbol are copied and inserted into the effective OFDM symbol as the guard interval signals 'I'. The guard interval 'I' has a length of an L sample.

Further, because the OFDM mobile communication system includes the time-varying frequency selective fading channel conditions, it is necessary to newly model received signals in the time-varying frequency selective fading channel conditions in order to estimate the frequency offset and the symbol timing offset.

Hereinafter, a process for modeling the received signals in the time-varying frequency selective fading channel conditions will be described. In describing the present invention, it is assumed that the guard interval signals used in the OFDM mobile communication system are inserted using the cyclic prefix scheme. The guard interval signals will be referred to as a 'CP'.

When it is assumed that the symbol timing offset is $\tau$ and the frequency offset is $\epsilon$, the received signals in the time-varying frequency selective fading channel conditions may be modeled as expressed by Equation (1) below.

$$r(n) = \left[\sum_{k=0}^{L-1} s(n-k-\tau) \cdot h_k(n)\right] e^{j2\pi\epsilon n/N} + w(n) \quad (1)$$

In Equation (1), L represents the number of multi-paths and $h_k(n)$ represents an $k^{th}$ multi-path component in an $n^{th}$ sample where n represents the sample index on the time domain. And w(n) represents AWGN. The $k^{th}$ multi-path component $h_k(n)$ in the $n^{th}$ symbol may be expressed by Equation (2) below.

$$h_k(n) = \alpha_k \cdot g_k(n) \quad (2)$$

In Equation (2), when $\alpha_k$ represents the square root of the average power in the $k^{th}$ multi-path, $g_k(n)$ represents a function in which an average power value in the $k^{th}$ multi-path is 1. Accordingly, an auto correlation function of a fading channel may be expressed as a complex Gaussian random process according to a Jakes model as expressed by Equation (3) below.

$$E\{g_k(n_1) \cdot g_l^*(n_2)\} = J_0\left(2\pi f_d |n_1 - n_2| \frac{T_s}{N}\right) \cdot \delta(k-1) \quad (3)$$

In Equation (3), $f_d$ represents a Doppler frequency, $T_s$ represents one OFDM symbol period, N represents an FFT size, $J_0(\bullet)$ represents a zero$^{th}$ order Bessel function of the first kind, and $\delta(\bullet)$ represents a Delta function.

Figure 2:
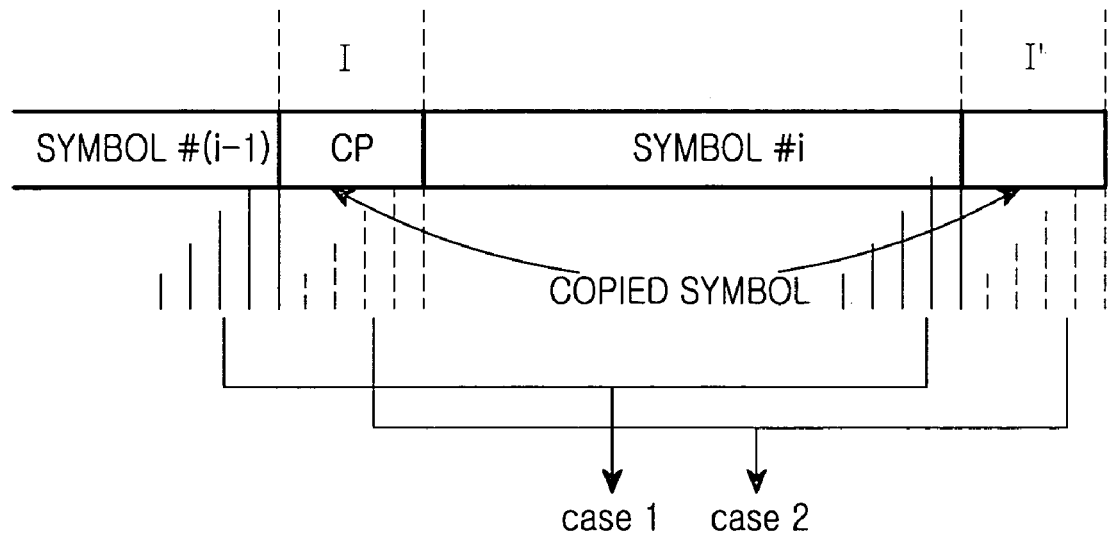
FIG. 2 is a diagram illustrating a correlation of received multi-path signals in an OFDM mobile communication system.

FIG. 2 is a diagram illustrating a correlation of received signals based on a multi-path in an OFDM mobile communication system.

Before describing FIG. 2, the correlation of signals received through different multi-paths is 0 as described in Equation (3). In FIG. 2, 'Case 1' represents a correlation between the first sample of a CP in the received signals and a sample spaced from the first sample of the CP by N samples, and 'Case 2' represents a correlation between the last sample of the CP in the received signals and a sample spaced from the last sample of the CP by the N samples. The correlations in Cases 1 and 2 may be expressed by Equations (4) and (5) below, respectively.

Case 1: $E\{r(1) \cdot r^*(1+N)\} = \sigma_s^2 J_0(2\pi f_d T_s) \cdot \alpha_0^2$ (4)

Case 2: $E\{r(N_{CP}) \cdot r^*(N_{CP}+N)\} = \sigma_s^2 J_0(2\pi f_d T_s)$ (5)

As expressed by Equations (4) and (5), the correlations of the received signals are different in Cases 1 and 2. Because a scheme for estimating a frequency offset and a timing offset by means of a CP according to the prior art models signals in Additive White Gaussian Noise (AWGN) or time-varying flat fading channel conditions, Cases 1 and 2 show the correlation as expressed by Equation (5). However, in channel conditions having a multi-path, because Case 1 includes Inter-Symbol Interference (ISI), Case 1 shows the correlation different from that of Case 2. Accordingly, it is necessary to estimate the frequency offset and the timing offset so as to prevent performance deterioration due to the multi-path.

Hereinafter, a process for modeling the $\alpha$-function will be described.

It is usual that a power delay profile actually considering channel conditions in an urban area follows an exponentially decaying power delay profile. The exponentially decaying power delay profile shows the degree of attenuation to be different according to a multi-path or a maximum delay spread. In the OFDM mobile communication system, it is usual that the CP is designed considering the number of multi-paths, i.e., the CP is designed to be more than the number of multi-paths. As the number of multi-paths or the maximum delay spread increases, a channel spread widely. An equal gain power delay profile frequently considered together with the exponentially decaying power delay profile is a power delay profile obtained when the maximum delay spread is theoretically infinite ($\infty$) in the exponentially decaying power delay profile.

However, because the receiver of the OFDM mobile communication system cannot recognize the average power profile of the time-varying frequency selective fading channel, it is necessary to perform a process for modeling the power profile of the time-varying frequency selective fading channel. Hereinafter, for convenience of description, it is assumed that the transmitter of the OFDM mobile communication system is a Base Station (BS) and the receiver of the OFDM mobile communication system is a Mobile Subscriber Station (MSS).

As described above, because the power profile in the actual channel conditions shows the exponentially decaying power delay profile characteristic, the $\alpha$-function may be assumed as $\alpha_k = C \cdot e^{bk}$ in Equation (2). In order to solve the equation $\alpha_k = C \cdot e^{bk}$, it is necessary to derive two unknown quantities, i.e., the constant C required for the normalization of an average power value, and the constant b relating to a maximum delay spread value. However, because information recognizable by a MSS is only that the sum of the average power of signals received through all multi-paths is 1, it is actually impossible to derive the constant C required for the normalization of the average power value, and the constant b relating to the maximum delay spread value.

Accordingly, in the present invention, it is necessary to detect the $\alpha$-function which has characteristics nearly similar to those of an exponential function and may be modeled with only the information that the sum of the average power of the signals received through all multi-paths is 1. As a result, a modeling may be performed by a plurality of special functions including a polynomial function, but a fractional function having characteristics nearly similar to those of the exponential function may be assumed as the $\alpha$-function which may be expressed by Equation (6) below.

$$\alpha_k = \frac{C}{k}, \quad C \text{ is a constant} \tag{6}$$

If it is assumed that the number of multi-paths is identical to the length $N_{CP}$ of the CP in the $\alpha$-function of Equation (6), the constant C may be expressed by Equation (7) below.

$$\sum_{k=1}^{N_{CP}} \alpha_k^2 = 1 \rightarrow C = \sqrt{\frac{1}{\sum_{k=1}^{N_{CP}} k^2}} \tag{7}$$

Hereinafter, a comparison among a general exponentially decaying power delay profile and equal gain power delay profile, and the power profile, i.e., the $\alpha$-function, of the time-varying frequency selective fading channel according to an embodiment of the present invention will be described with reference to FIG. 3.

Figure 3:
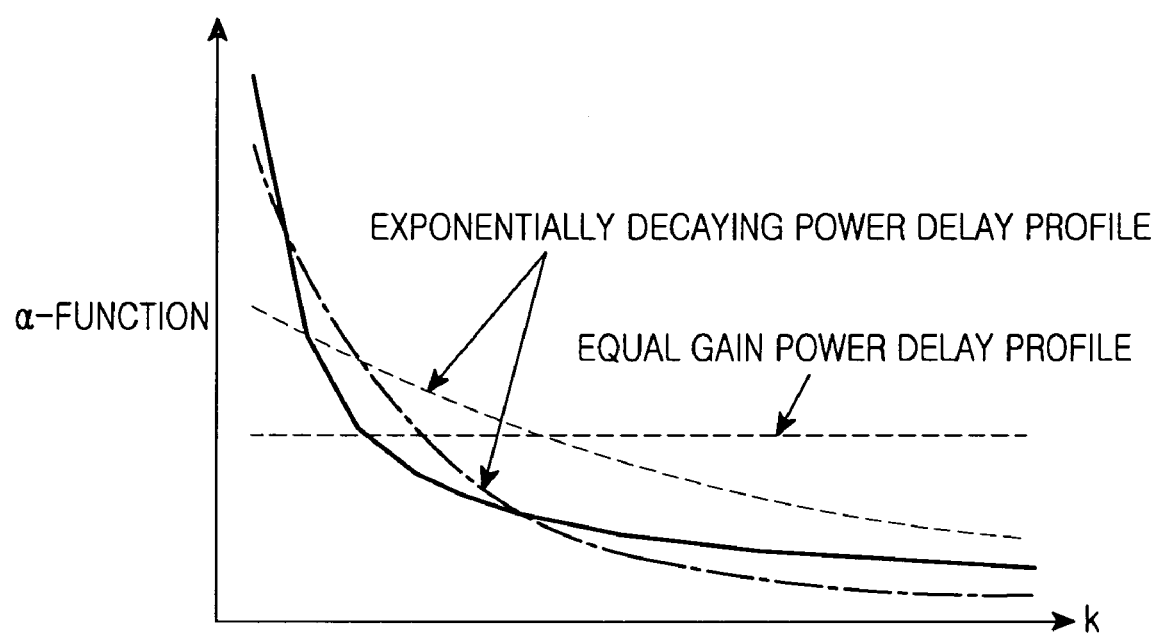
FIG. 3 is a graph illustrating a comparison among an α-function, a general exponentially decaying power delay profile and equal gain power delay profile, where the α-function represents a power profile of a time-varying frequency selective fading channel according to an embodiment of the present invention.

FIG. 3 is a graph illustrating the comparison among the $\alpha$-function, the general exponentially decaying power delay profile and equal gain power delay profile, where the $\alpha$-function represents the power profile of the time-varying frequency selective fading channel according to the embodiment of the present invention.

In FIG. 3, a curve marked by a solid line corresponds to the $\alpha$-function and curves marked by dotted lines correspond to the general exponentially decaying power delay profile and equal gain power delay profile. As illustrated in FIG. 3, it can be understood that the $\alpha$-function has characteristics nearly similar to those of the exponentially decaying power delay profile. However, if the maximum delay spread value changes in the exponentially decaying power delay profile, the similarity between the exponentially decaying power delay profile and the $\alpha$-function deteriorates greatly. In an extreme case, similar characteristics are nearly non-existent between the equal gain power delay profile, in which the maximum delay spread is infinite, and the $\alpha$-function.

In the OFDM mobile communication system, actual channel conditions may have characteristics of the exponentially decaying power delay profile or the equal gain power delay profile, which is less similar to the $\alpha$-function representing the power profile of the time-varying frequency selective fading channel considered in the embodiment of the present invention. However, when the frequency offset and the symbol timing offset are estimated considering the $\alpha$-function, the estimation performance is superior to that when the frequency offset and the symbol timing offset are estimated according to the prior art. The performance improvement when the frequency offset and the symbol timing offset are estimated considering the $\alpha$-function will be described later, the detailed description will be omitted here.

When considering the correlation between the received signals modeled as described above and the received signals through the multi-path, the log probability distribution of the symbol timing offset $\tau$ and the frequency offset $\epsilon$ may be expressed by Equation (8) below.

$$\begin{aligned}\Lambda(\tau, \varepsilon) &= \log f(r \mid \tau, \varepsilon) \\ &= \log\left(\prod_{n \in I} f(r(n), r(n+N)) \prod_{n \notin I \cup \Gamma} f(r(n))\right) \\ &= \log\left(\prod_{n \in I} \frac{f(r(n), r(n+N))}{f(r(n))f(r(n+N))} \prod_n f(r(n))\right)\end{aligned} \tag{8}$$

In Equation (8), because $$\prod_n f(r(n))$$

becomes a value unrelated to the symbol timing offset $\tau$ and the frequency offset $\epsilon$, the log probability distribution as expressed by Equation (8) may be simply expressed by Equation (9) below. The reason that $$\prod_n f(r(n))$$

becomes the value unrelated to the symbol timing offset $\tau$ and the frequency offset $\epsilon$ is because a multiplication operation is performed for all n. Therefore, $$\prod_n f(r(n))$$

becomes the value unrelated to the symbol timing offset $\tau$. Further, because f(r(n)) does not change for a phase rotation, $$\prod_n f(r(n))$$

becomes the value unrelated to the frequency offset $\epsilon$. In Equation (8), f(r(n)) represents the probability distribution function of the $n^{th}$ sample of the received signals on a time domain, and $$\prod_n f(r(n))$$

represents a joint probability distribution function for the entire received signals in an observation interval.

$$\Lambda(\tau, \varepsilon) = \sum_{n=\tau}^{\tau+N_{CP}-1} \log\left(\frac{f(r(n), r(n+N))}{f(r(n))f(r(n+N))}\right) \quad (9)$$

As a result, when the symbol timing offset $\tau$ and the frequency offset $\epsilon$ for maximizing the $\Lambda(\tau, \epsilon)$ are detected in the log probability distribution function as expressed by Equation (9), the detected symbol timing offset $\tau$ and frequency offset $\epsilon$ become exactly the estimated symbol timing offset $\tau$ and the frequency offset $\epsilon$.

Before detecting the symbol timing offset $\tau$ and the frequency offset $\epsilon$ for maximizing the $\Lambda(\tau, \epsilon)$ in the log probability distribution function as expressed by Equation (9), it is necessary to detect the complex Gaussian probability distributions f(r(n), r(n+N)) and f(r(n)) in order to solve the log probability distribution function as expressed by Equation (9). The complex Gaussian probability distributions f(r(n), r(n+N)) and f(r(n)) may be expressed by Equations (10) and (11) below, respectively.

$$f(r(n)) = \frac{\exp\left(-\frac{|r(n)|^2}{\sigma_s^2 + \sigma_w^2}\right)}{\pi(\sigma_s^2 + \sigma_w^2)} \quad (10)$$

In Equation (10), $\sigma_s^2$ represents average power of transmitted signals s(•) and $\sigma_w^2$ represents average power of AWGN w(•).

$$f(r(n), r(n+N)) = \quad (11)$$

-continued $$\frac{\exp\left(-\frac{|r(n)|^2 - 2\rho_n\text{Re}\{e^{j2\pi\varepsilon}r(n)r^*(n+N)\} + |r(n+N)|^2}{(\sigma_s^2 + \sigma_w^2)(1 - \rho_n^2)}\right)}{\pi^2(\sigma_s^2 + \sigma_w^2)(1 - \rho_n^2)}$$

In Equation (11), $\rho_n$ represents a correlation coefficient absolute value between an $n^{th}$ sample and an $(n+N)^{th}$ sample in the received signals.

When the complex Gaussian probability distributions f(r(n), r(n+N)) and f(r(n)) as expressed by Equations (10) and (11) are put into the log probability distribution function as expressed by Equation (9), the log probability distribution function may be expressed by Equation (12) below.

$$\Lambda(\tau, \varepsilon) = -\sum_{n=\tau}^{\tau+N_{CP}-1} \log(1 - \rho_n^2) - \quad (12)$$

$$\sum_{n=\tau}^{\tau+N_{CP}-1} \frac{\rho_n^2|r(n)|^2 + \rho_n^2|r(n+N)|^2 - 2\rho_n\text{Re}\{r(n)r^*(n+N)e^{j2\pi\varepsilon}\}}{(1-\rho_n^2)(\sigma_s^2 + \sigma_w^2)}$$

$$\rho_{\tau+l} = \sum_{k=1}^{l+1} \frac{C^2 \cdot \sigma_s^2 J_0(2\pi f_d T_s)}{k^2(\sigma_s^2 + \sigma_w^2)} \quad l = 0, 1, \cdots, N_{CP} - 1$$

In Equation (12), because $$\sum_{n=\tau}^{\tau+N_{CP}-1} \log(1 - \rho_n^2)$$

is a value unrelated to the symbol timing offset $\tau$ and the frequency offset $\epsilon$, it may also be removed from Equation (12). Accordingly, when an equation obtained by removing $$\sum_{n=\tau}^{\tau+N_{CP}-1} \log(1 - \rho_n^2)$$

from Equation (12) is defined as a log probability distribution function $\Lambda_{2nd}(\tau, \epsilon)$, the log probability distribution function $\Lambda_{2nd}(\tau, \epsilon)$ may be expressed by Equation (13) below.

$$\Lambda_{2nd}(\tau, \varepsilon) \equiv \frac{2}{\sigma_s^2 + \sigma_w^2}\left[\text{Re}\left\{\sum_{n=\tau}^{\tau+N_{CP}-1} \frac{\rho_n r(n)r^*(n+N)}{(1-\rho_n^2)}e^{j2\pi\varepsilon}\right\} - \quad (13)\right.$$

$$\left. \frac{1}{2}\sum_{n=\tau}^{\tau+N_{CP}-1} \frac{\rho_n^2(|r(n)|^2 + |r(n+N)|^2)}{(1-\rho_n^2)}\right]$$

In order to simplify the log probability distribution function $\Lambda_{2nd}(\tau, \epsilon)$ as expressed by Equation (13), two parameters, i.e., $\gamma(n)$ and $\Phi(n)$, may be defined as expressed by Equations (14) and (15).

$$\gamma(n) \equiv \sum_{n=\tau}^{\tau+N_{CP}-1} \frac{\rho_n}{1-\rho_n^2} r(n)r^*(n+N) \quad (14)$$

-continued $$\Phi(n) \equiv \frac{1}{2} \sum_{n=\tau}^{\tau+N_{CP}-1} \frac{\rho_n^2}{(1-\rho_n^2)} \{|r(n)|^2 + |r(n+N)|^2\} \quad (15)$$

It can be understood that $\gamma(n)$ shows a modified form of a correlation part as expressed by Equation (14) and $\Phi(n)$ shows a modified form of an energy part as expressed by Equation (15).

When the parameters $\gamma(n)$ and $\Phi(n)$, defined by Equations (14) and (15), are applied to the log probability distribution function, $\Lambda_{2nd}(\tau, \epsilon)$ of Equation (13), the $\Lambda_{2nd}(\tau, \epsilon)$ may be expressed by Equation (16) below.

$$\Lambda_{2nd}(\tau, \varepsilon) = \frac{2}{\sigma_s^2 + \sigma_w^2}[\text{Re}\{\gamma(\tau)\}\cos(2\pi\varepsilon) - \text{Im}\{\gamma(\tau)\}\sin(2\pi\varepsilon) - \Phi(\tau)] \quad (16)$$

$$= \frac{2}{\sigma_s^2 + \sigma_w^2}[|\gamma(\tau)|\cos(2\pi\varepsilon + \angle\gamma(\tau)) - \Phi(\tau)]$$

Further, in order to estimate the symbol timing offset $\tau$ and the frequency offset $\epsilon$ the following steps must be performed.

In the first step, an estimation frequency offset $\hat{\epsilon}$ for maximizing the log probability distribution function $\Lambda_{2nd}(\tau, \epsilon)$ is detected. When the log probability distribution function $\Lambda_{2nd}(\tau, \epsilon)$ is partially differentiated with respect to the frequency offset $\epsilon$, it is possible to obtain results as expressed by Equations (17) and (18).

$$\hat{\varepsilon} = -\frac{1}{2\pi}\tan^{-1}\left[\frac{\text{Im}\{\gamma(\tau)\}}{\text{Re}\{\gamma(\tau)\}}\right] = -\frac{1}{2}\angle\gamma(\tau) \quad (17)$$

$$2\pi\hat{\varepsilon}(\tau) + \angle\gamma(\tau) = 2\pi n, \quad n \text{ is an interger} \quad (18)$$

In the second step, the results obtained from Equations (17) and (18) are put into Equation (16) in order to express an equation relating to the symbol timing offset $\tau$. This equation may be expressed by Equations (19) and (20).

$$\hat{\tau}_{ML} = \underset{\tau}{\text{argmax}}\{|\gamma(\tau)| - \Phi(\tau)\} \quad (19)$$

$$\hat{\varepsilon}_{ML} = -\frac{1}{2\pi}\angle\gamma(\hat{\tau}_{ML}) \quad (20)$$

As a result, the symbol timing offset $\hat{\tau}_{ML}$ and the frequency offset $\hat{\epsilon}_{ML}$ as expressed by Equations (19) and (20) become a symbol timing offset and a frequency offset estimated in consideration of the time-varying frequency selective fading channel conditions. Consequently, the symbol timing offset and frequency offset estimation scheme proposed by the present invention as described above becomes a Maximum Likelihood (ML) symbol timing offset and frequency offset estimation scheme.

Figure 4:
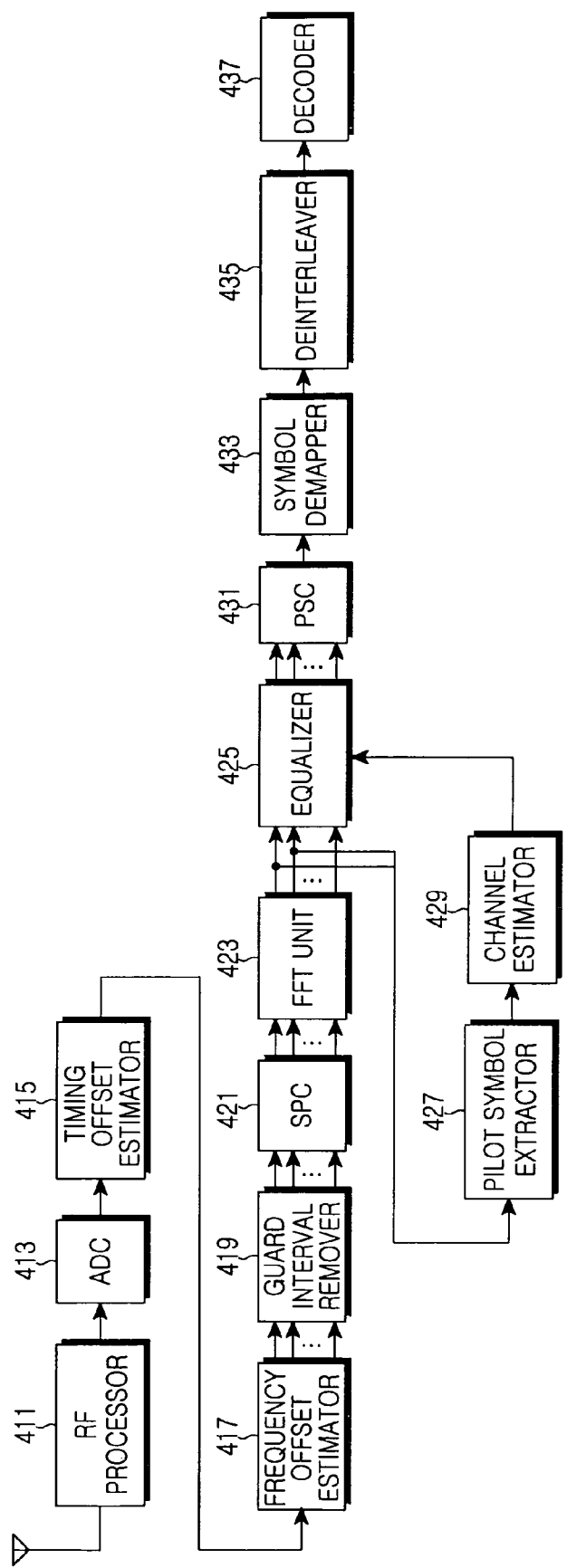
FIG. 4 is a block diagram of a MSS of an OFDM mobile communication system, which performs functions in an embodiment of the present invention.

FIG. 4 is a block diagram of the MSS of the OFDM mobile communication system, which performs functions in an embodiment of the present invention.

Referring to FIG. 4, the MSS of the OFDM mobile communication system includes a Radio Frequency (RF) processor 411, an Analog-to-Digital Converter (ADC) 413, a timing offset estimator 415, a frequency offset estimator 417, a guard interval remover 419, a Serial-to-Parallel Converter (SPC) 421, an FFT unit 423, an equalizer 425, a pilot symbol extractor 427, a channel estimator 429, a Parallel-to-Serial Converter (PSC) 431, a symbol demapper 433, a deinterleaver 435, and a decoder 437.

Transmission signals from the BS of the OFDM mobile communication system become signals in which noise is added to the transmission signals while the transmission signals experience a multi-path channel, and are received through a receive (Rx) antenna. The signals received through the Rx antenna are input to the RF processor 411. The RF processor 411 down-converts the input signals to analog signals of an Intermediate Frequency (IF) band, and outputs the analog signals to the ADC 413.

The ADC 413 converts the analog signal outputs from the RF processor 411 into digital signals, and outputs the digital signals to the timing offset estimator 415. The timing offset estimator 415 inputs the signal outputs from the ADC 413, estimates the timing offset, i.e., the symbol timing offset $\tau$, by the maximum likelihood scheme as described above, and outputs the estimated symbol timing offset $\tau$ to the frequency offset estimator 417. Because the estimation operation of the symbol timing offset $\tau$ by the maximum likelihood scheme has been previously described, the detailed description will be omitted here. The frequency offset estimator 417 inputs the signals output from the timing offset estimator 415, estimates the frequency offset $\epsilon$ by the maximum likelihood scheme as described above, and outputs the estimated frequency offset $\epsilon$ to the guard interval remover 419. Because the estimation operation of the frequency offset $\epsilon$ by the maximum likelihood scheme has been previously described, the detailed description will be omitted here.

The guard interval remover 419 inputs the signal outputs from the timing offset estimator 415 and the frequency offset estimator 417, removes guard interval signals from the input signals, and outputs serial signals to the SPC 421. The SPC 421 inputs the serial signal outputs from the guard interval remover 419, performs a parallel conversion for the input signals, and outputs the converted signals to the FFT unit 423. The FFT unit 423 performs an N-point FFT for the signals output from the SPC 421 and outputs predetermined signals to the equalizer 425.

The equalizer 425 inputs the signal outputs from the FFT unit 423, performs a channel equalization for the input signals, and outputs parallel signals to the PSC 431. The PSC 431 inputs the parallel signals output from the equalizer 425, performs a serial conversion for the input signals, and outputs the converted signals to the symbol demapper 433.

The signal outputs from the FFT unit 423 are also input to the pilot symbol extractor 427. The pilot symbol extractor 427 extracts pilot symbols from the signals output from the FFT unit 423, and outputs the extracted pilot symbols to the channel estimator 429. Herein, the channel estimation operation of the channel estimator 429 is not performed for estimating the symbol timing offset and the frequency offset, but performed for acquiring fine synchronization while communication is actually performed after the symbol timing offset and the frequency offset is estimated, i.e., synchronization is acquired.

The symbol demapper 433 demodulates the signals output from the PSC 431 by a demodulation scheme corresponding to a modulation scheme applied to the BS of the OFDM mobile communication system, and outputs the demodulated signals to the deinterleaver 435. The deinterleaver 435 deinterleaves the signal outputs from the symbol demapper 433 by a deinterleaving scheme corresponding to an interleaving scheme applied to the BS of the OFDM mobile communication system, and outputs the deinterleaved signals to the decoder 437. The decoder 437 decodes the signal outputs from the deinterleaver 435 by a decoding scheme corresponding to a coding scheme applied to the BS of the OFDM mobile communication system, and outputs the decoded signals as information data transmitted from the transmission side.

Hereinafter, a performance comparison between the symbol timing and frequency offset estimation scheme using the maximum likelihood scheme proposed by the present invention and the symbol timing and frequency offset estimation scheme according to the prior art will be described.

First, the following channel conditions are assumed for the performance comparison between the symbol timing and frequency offset estimation scheme using the maximum likelihood scheme proposed by the present invention and the symbol timing and frequency offset estimation scheme according to the prior art:

(1) The number N of sub-channels=128;
(2) The length $N_{CP}$ of a CP=16;
(3) The number L of multi-paths=12;
(4) Carrier frequency=2 [GHz];
(5) Sampling rate=1.4414 [MH];
(6) Mobile speed: 1 [km/h], 60 [km/h];
(7) The number $N_s$ of symbols=1 ~11; and
(8) Symbol timing offset is normalized as $N_{CP}+N$ and frequency offset is normalized as ISI.

Before the performance comparison between the symbol timing and frequency offset estimation scheme using the maximum likelihood scheme proposed by the present invention and the symbol timing and frequency offset estimation scheme according to the prior art, it is necessary to perform a process for determining the estimation accuracy of the symbol timing offset and the frequency offset in the OFDM mobile communication system.

In order to determine the estimation accuracy of the symbol timing offset and the frequency offset in the OFDM mobile communication system, the following two processes must be performed: (1) performance evaluation criteria for evaluating the estimation accuracy of the symbol timing offset must be established, and performance required according to the performance evaluation criteria must also be considered; and (2) performance evaluation criteria for evaluating the estimation accuracy of the frequency offset must be established, and performance required according to the performance evaluation criteria must also be considered.

Hereinafter, a process for establishing the performance evaluation criteria for evaluating the estimation accuracy of the symbol timing offset and the performance required according to the performance evaluation criteria will be described.

First, in the performance evaluation, a Mean Square Error (MSE) based on a symbol timing offset estimation value is used. It is assumed that a sample index of an OFDM symbol for which synchronization has been acquired is $\{-N_{CP}, \ldots, -1, 0, 1, \ldots, N-1\}$, the symbol timing offset is $\tau$, and a maximum channel delay spread value is $L_{max}$. In this case, when the symbol timing offset $\tau$ exists within the range of Equation (21) below, orthogonality is maintained between sub-carriers. Accordingly, the FFT operation is performed for the symbol timing offset is $\tau$, and then only a phase rotation occurs in a sample value of the OFDM symbol. The phase rotation may be compensated by the equalizer of the MSS in the OFDM mobile communication system.

$$\tau \in \{-N_{CP}+L_{max}, -N_{CP}+L_{max}+1, \ldots, 0\} \quad (21)$$

However, when the symbol timing offset $\tau$ does not exist within the range of Equation (21), the orthogonality is not maintained between the sub-carriers because an ISI and an Inter-carrier Interference (ICI) occur. Therefore, the performance of the OFDM mobile communication system may deteriorate greatly. Accordingly, it is assumed that the performance targeted by the OFDM mobile communication system is satisfied when the estimation value of the symbol timing offset $\tau$ exists within the range of Equation (21). Because the length $N_{CP}$ of the CP is 16 and the number L of multi-paths is 12 in the channel conditions assumed for the performance comparison between the symbol timing and frequency offset estimation scheme using the maximum likelihood scheme proposed by the present invention and the general symbol timing and frequency offset estimation scheme, the symbol timing offset $\tau$ must be maintained within at least 4(=16−12) samples. This is so that the performance targeted by the OFDM mobile communication system can be satisfied.

When it is generally assumed that the MSE is $\sigma$ and an allowable error in the length $N_{CP}$ of the CP is $\delta$%, the symbol timing offset $\tau$ must satisfy Equation (22).

$$3\sigma \leq \frac{N_{CP}}{N+N_{CP}} \times \frac{\delta}{100} \quad (22)$$

That is, Equation (22) represents that the symbol timing offset $\tau$ exists within the range of the allowable error $\delta$% in the length $N_{CP}$ of the CP with the reliability of more than 99% when the MSE is $\sigma$. For example, when the parameters for the channel conditions, which are assumed for the performance comparison between the symbol timing and frequency offset estimation scheme using the maximum likelihood scheme proposed by the present invention and the symbol timing and frequency offset estimation scheme according to the prior art, are put into Equation (22), the MSE $\sigma^2$ must be less than $8.57 \times 10^{-5}$ $$\left( \cong \left( \frac{16 \times 0.25}{3 \times (128+16)} \right)^2 \right)$$

in order to allow an error after estimation of the symbol timing offset $\tau$ to exist within the range of 25%.

Next, a process for establishing the performance evaluation criteria for evaluating the estimation accuracy of the frequency offset and the performance required according to the performance evaluation criteria will be described.

First, in the performance evaluation, an MSE based on a frequency offset estimation value is used. The estimation accuracy of the frequency offset may be checked through Bit Error Rate (BER) performance. An error in the frequency offset estimation may be allowable up to for a case in which performance deterioration of less than about 1 [dB] occurs as compared with no error case with respect to the BER of $10^{-3}$. This is because the error in the frequency offset estimation may have a value of about 1% of an interval between adjacent sub-carriers. Hereinafter, a relation between the allowable error of the interval between the sub-carriers and the MSE based on the frequency offset estimation value will be described.

First, when it is assumed that the MSE is $\sigma$ and the allowable error of the interval between the sub-carriers is $\delta$%, Equation (23) must be satisfied.

$$3\sigma \leq \frac{\delta}{100} \quad (23)$$

That is, Equation (23) represents that the frequency offset ε exists within the range of the allowable error δ% of the interval between the sub-carriers with the reliability of more than 99% when the MSE is σ. For example, when the parameters in the channel conditions, which are assumed for the performance comparison between the symbol timing and frequency offset estimation scheme using the maximum likelihood scheme proposed by the present invention and the general symbol timing and frequency offset estimation scheme, are put into Equation (23), the MSE $\sigma^2$ must be less than $$1.11 \times 10^{-5} \left( \cong \left( \frac{1}{3 \times 100} \right)^2 \right)$$

in order to allow an error after estimation of the frequency offset ε to exist within the range of 1% of the interval between the sub-carriers.

For the performance comparison between the symbol timing and frequency offset estimation scheme using the maximum likelihood scheme proposed by the present invention and the symbol timing and frequency offset estimation scheme according to the prior art, a scheme is used, in which one OFDM symbol to 11 OFDM symbols are transmitted in the mobile communication system, thereby improving the estimation accuracy of the symbol timing offset and the frequency offset.

Hereinafter, the performance comparison between the symbol timing and frequency offset estimation scheme using the maximum likelihood scheme proposed by the present invention and the symbol timing and frequency offset estimation scheme according to the prior art will be described with reference to FIGS. 5 and 6 according to the number of transmitted OFDM symbols in channel conditions with the exponentially decaying power delay profile.

Figure 5:
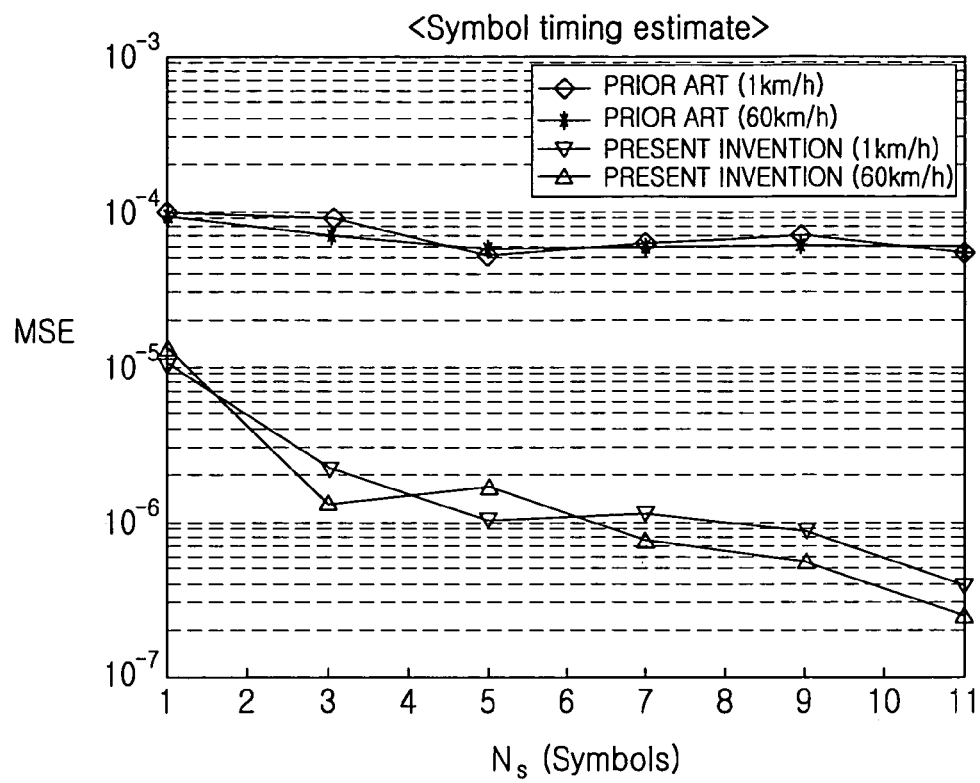
FIG. 5 is a graph illustrating a Mean Square Error (MSE) performance comparison between a symbol timing offset estimation scheme using a maximum likelihood scheme proposed by the present invention and a symbol timing offset estimation scheme according to the prior art based on the number of transmitted OFDM symbols in channel conditions with an exponentially decaying power delay profile.

FIG. 5 is a graph illustrating an MSE performance comparison between the symbol timing offset estimation scheme using the maximum likelihood scheme proposed by the present invention and the symbol timing offset estimation scheme according to the prior art based on the number of transmitted OFDM symbols in the channel conditions with the exponentially decaying power delay profile.

Referring to FIG. 5, Cases are shown when the movement speeds of the MSS are 1 [km/h] and 60 [km/h] in the channel conditions with the exponentially decaying power delay profile.

Figure 6:
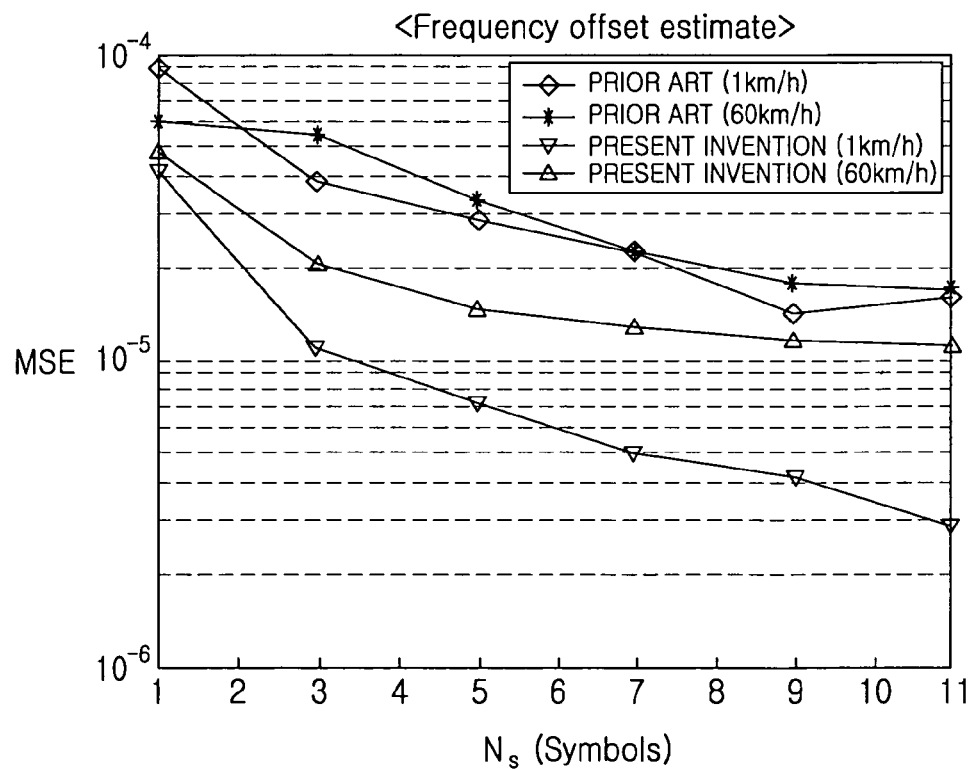
FIG. 6 is a graph illustrating an MSE performance comparison between a frequency offset estimation scheme using a maximum likelihood scheme proposed by the present invention and a frequency offset estimation scheme according to the prior art based on the number of transmitted OFDM symbols in channel conditions with an exponentially decaying power delay profile.

FIG. 6 is a graph illustrating an MSE performance comparison between the frequency offset estimation scheme using the maximum likelihood scheme proposed by the present invention and the frequency offset estimation scheme according to the prior art based on the number of transmitted OFDM symbols in the channel conditions with the exponentially decaying power delay profile. Referring to FIG. 6, Cases are shown when the movement speeds of the mobile subscriber station are 1 [km/h] and 60 [km/h] in the channel conditions with the exponentially decaying power delay profile.

As illustrated in FIGS. 5 and 6, where the frequency offset estimation scheme according to the prior art is used, the estimation scheme can satisfy all of the MSE performance evaluation criteria of the symbol timing offset and the frequency offset when the number of OFDM symbols is 9 under the condition that the movement speed of the mobile subscriber station is 1 [km/h], and when the number of OFDM symbols is 11 under the condition that the movement speed of the mobile subscriber station is 60 [km/h].

However, where the symbol timing offset estimation scheme using the maximum likelihood scheme proposed by the present invention is used, the estimation scheme can satisfy all of the MSE performance evaluation criteria of the symbol timing offset and the frequency offset when the number of OFDM symbols is 3 under the condition that the movement speed of the mobile subscriber station is 1 [km/h], and when the number of OFDM symbols is 6 under the condition that the movement speed of the mobile subscriber station is 60 [km/h].

As a result, when the symbol timing and frequency offset estimation scheme using the maximum likelihood scheme proposed by the present invention is used, it is possible to satisfy all of the MSE performance evaluation criteria only with the relatively small number of the OFDM symbols, as compared with the case where the symbol timing offset and frequency offset estimation scheme according to the prior art is used. Consequently, it is possible to minimize time delay due to the estimation of the symbol timing offset and the frequency offset.

Hereinafter, the performance comparison between the symbol timing and frequency offset estimation scheme using the maximum likelihood scheme proposed by the present invention and the symbol timing and frequency offset estimation scheme according to the prior art will be described with reference to FIGS. 7 and 8 according to the number of transmitted OFDM symbols in channel conditions with the equal gain power delay profile.

Figure 7:
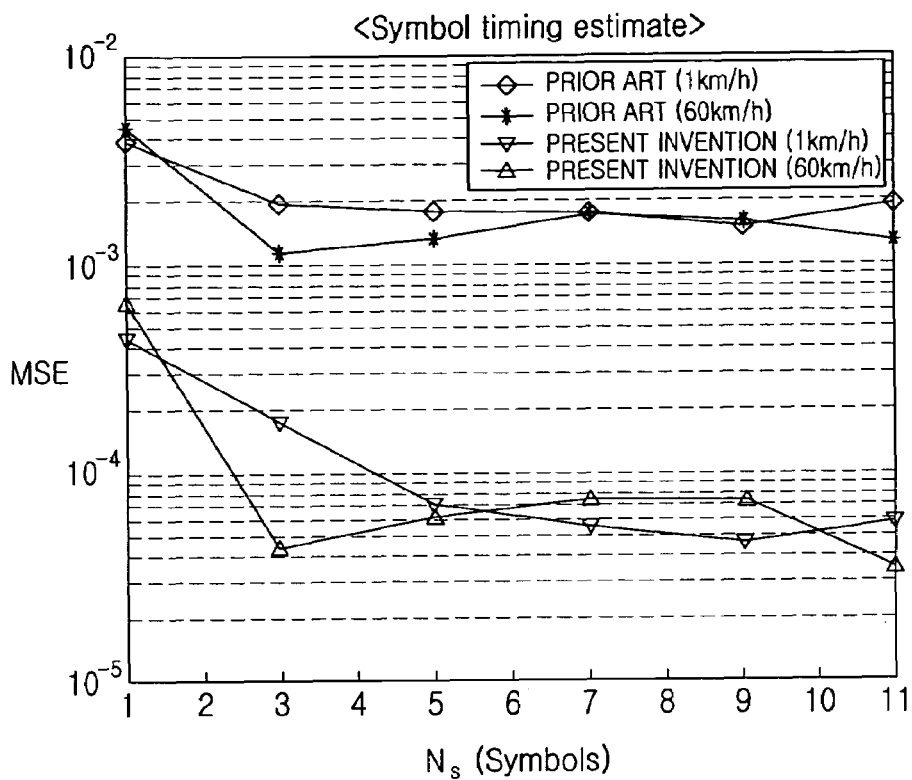
FIG. 7 is a graph illustrating an MSE performance comparison between a symbol timing offset estimation scheme using a maximum likelihood scheme proposed by the present invention and a symbol timing offset estimation scheme according to the prior art based on the number of transmitted OFDM symbols in channel conditions with an equal gain power delay profile.

FIG. 7 is a graph illustrating an MSE performance comparison between the symbol timing offset estimation scheme using the maximum likelihood scheme proposed by the present invention and the symbol timing offset estimation scheme according to the prior art based on the number of transmitted OFDM symbols in the channel conditions with the equal gain power delay profile. Referring to FIG. 7, Cases are shown when the movement speeds of the MSS are 1 [km/h] and 60 [km/h] in the channel conditions with the equal gain power delay profile.

Figure 8:
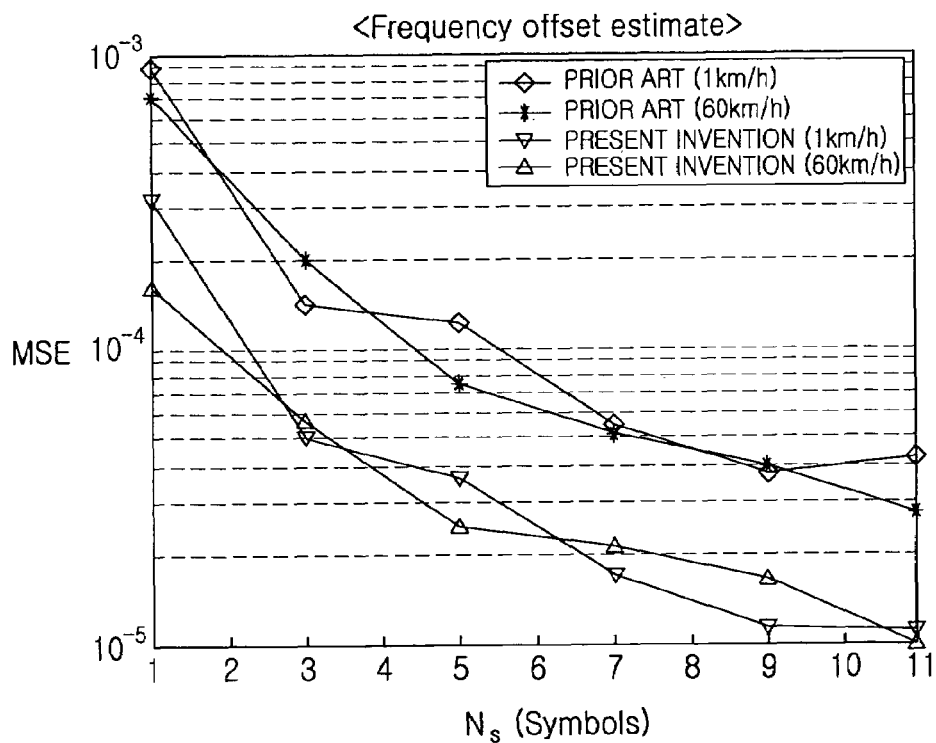
FIG. 8 is a graph illustrating an MSE performance comparison between a frequency offset estimation scheme using a maximum likelihood scheme proposed by the present invention and a frequency offset estimation scheme according to the prior art based on the number of transmitted OFDM symbols in channel conditions with an equal gain power delay profile.

FIG. 8 is a graph illustrating an MSE performance comparison between the frequency offset estimation scheme using the maximum likelihood scheme proposed by the present invention and the frequency offset estimation scheme according to the prior art based on the number of transmitted OFDM symbols in the channel conditions with the equal gain power delay profile. Referring to FIG. 8, when the movement speeds of the mobile subscriber station are 1 [km/h] and 60 [km/h] in the channel conditions with the equal gain power delay profile.

As illustrated in FIGS. 7 and 8, where the symbol timing offset and frequency offset estimation scheme using the maximum likelihood scheme proposed by the present invention is used, the estimation scheme can satisfy all of the MSE performance evaluation criteria of the symbol timing offset and the frequency offset when the number of OFDM symbols is 7 under the condition that the movement speed of the mobile subscriber station is 1 [km/h], and when the number of OFDM symbols is 9 under the condition that the movement speed of the mobile subscriber station is 60 [km/h].

However, when the symbol timing offset estimation scheme according to the prior art is used, an error floor occurs in spite of increase in the number of OFDM symbols, so that there is no improvement in terms of the performance. Therefore, the prior art estimation scheme cannot satisfy the MSE performance evaluation criteria of the symbol timing offset.

Table 1 below shows the complexities of the symbol timing offset and frequency offset estimation scheme using the maximum likelihood scheme proposed by the present invention and the symbol timing offset and frequency offset estimation scheme according to the prior art.

TABLE 1

| Prior art | Present invention |
|---|---|
| $(9 N_{CP} + 4) \cdot N + 3$ | $(11 N_{CP} + 3) \cdot N + 3$ |

As shown in Table 1, it can be understood that the symbol timing offset and frequency offset estimation scheme using the maximum likelihood scheme proposed by the present invention shows a slight increase in terms of the complexity, as compared with the symbol timing offset and frequency offset estimation scheme according to the prior art. However, in the symbol timing offset and frequency offset estimation scheme using a CP according to the prior art, an average must be calculated in a plurality of OFDM symbol intervals until a target MSE value is satisfied because the estimation scheme cannot satisfy the performance targeted by the OFDM mobile communication system during one OFDM symbol. Therefore, a time delay for the estimation of the symbol timing offset and the frequency offset occurs.

Accordingly, it is necessary to consider the total amount of calculation required for satisfying the performance targeted by the OFDM mobile communication system, i.e., the target MSE. Table 2 below shows the total amount of calculation required for satisfying the target MSEs of the symbol timing offset and frequency offset estimation scheme using the maximum likelihood scheme proposed by the present invention and the symbol timing offset and frequency offset estimation scheme according to the prior art.

TABLE 2

|  |  |  | Total amount of calculation | | | |
|---|---|---|---|---|---|---|
|  |  |  | Prior art | | Present invention | |
| Synchronization scheme | | | 1 km/h | 60 km/h | 1 km/h | 60 km/h |
| Movement speed of MSS | | | | | | |
| Power delay profile | Exponentially decaying power delay profile | number of OFDM symbols | 9 | 11 | 3 | 6 |
| | | number of times of operation | 166,403 | 203,267 | 67,971 | 135,555 |

As shown in Table 2, in a case where the symbol timing offset and frequency offset estimation scheme using the maximum likelihood scheme proposed by the present invention is used, when the movement speed of the mobile subscriber station is 1 [km/h], the amount of calculation can be reduced by about 2.4 times as compared with a case where the symbol timing offset and frequency offset estimation scheme according to the prior art is used. Further, in the case where the symbol timing offset and frequency offset estimation scheme using the maximum likelihood scheme proposed by the present invention is used, when the movement speed of the mobile subscriber station is 60 [km/h], the amount of calculation can be reduced by about 1.5 times as compared with a case where the symbol timing offset and frequency offset estimation scheme is used according to the prior art.

As a result, when the symbol timing offset and frequency offset estimation scheme using the maximum likelihood scheme proposed by the present invention is used, the amount of calculation required for the estimation of the symbol timing offset and the frequency offset during one OFDM symbol may slightly increase as shown in Table 1, as compared with a case where the symbol timing offset and frequency offset estimation scheme according to the prior art is used. However, the entire complexity for satisfying the target performance is reduced. Consequently, when the symbol timing offset and frequency offset estimation scheme using the maximum likelihood scheme proposed by the present invention is used, it is possible to exactly perform the estimation of the symbol timing offset and the frequency offset by means of the smaller number of the OFDM symbols and to reduce the complexity, as compared with the symbol timing offset and frequency offset estimation scheme according to the prior art is used.

According to the present invention as described above, it is possible to exactly estimate a symbol timing offset and a frequency offset by means of the relatively small number of the OFDM symbols, thereby minimizing time required for estimating the symbol timing offset and the frequency offset.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for acquiring synchronization in a mobile communication system using an Orthogonal Frequency Division Multiplexing (OFDM) scheme, the method comprising:

modeling a power delay profile in time-varying frequency selective fading channel conditions by a specific function;

receiving a signal by an OFDM receiver of the system;

generating a log probability distribution function of a timing offset and a frequency offset using a correlation between an $n^{th}$ sample from samples included in the received signal and an $(n+N)^{th}$ sample from samples included in the received signal; and estimating, using a maximum likelihood technique, a timing offset and a frequency offset of the $n^{th}$ sample based on the power delay profile and the log probability distribution function, wherein the estimating of the timing offset and the frequency offset is considered within a permissible range of values associated with a number of samples of the received signal.

2. The method as claimed in claim 1, wherein the log probability distribution function includes a correlation part component and an energy part component of the received signal.

3. The method as claimed in claim 1, wherein, when the mobile communication system using the OFDM scheme has $N_{CP}$ number of multi-paths and guard interval signals have a length of the $N_{CP}$, the specific function is expressed as $$\alpha_k = \frac{C}{k},$$

wherein k represents a $k^{th}$ multi-path of the $N_{CP}$ multi-paths and C is a constant expressed as $$C = \sqrt{\frac{1}{\sum_{k=1}^{N_{CP}} k^2}}.$$

4. The method as claimed in claim 3, wherein the log probability distribution function is expressed as $$\Lambda_{2nd}(\tau, \varepsilon) = \frac{2}{\sigma_s^2 + \sigma_w^2}[\text{Re}\{\gamma(\tau)\}\cos(2\pi\varepsilon) - \text{Im}\{\gamma(\tau)\}\sin(2\pi\varepsilon) - \Phi(\tau)] =$$
$$\frac{2}{\sigma_s^2 + \sigma_w^2}[|\gamma(\tau)|\cos(2\pi\varepsilon + \angle\gamma(\tau)) - \Phi(\tau)],$$

wherein $\Lambda_{2nd}(\tau, \varepsilon)$ represents the log probability distribution function, T represents the symbol timing offset, $\varepsilon$ represents frequency offset, $\sigma_s^2$ represents average power of transmitted signals s(•), $\sigma_w^2$ represents an average power of Additive White Gaussian Noise (AWGN), and $\gamma(n)$ and the $\Phi(n)$ are respectively expressed as $$\gamma(n) \equiv \sum_{n=\tau}^{\tau+N_{CP}-1} \frac{\rho_n}{1-\rho_n^2} r(n)r*(n+N),$$

wherein $\rho_n$ represents a correlation coefficient absolute value between the $n^{th}$ sample and the $(n+N)^{th}$ sample of the received signal r(n), and $$\Phi(n) \equiv \frac{1}{2}\sum_{n=\tau}^{\tau+N_{CP}-1} \frac{\rho_n^2}{(1-\rho_n^2)}\{|r(n)|^2 + |r(n+N)|^2\}.$$

5. The method as claimed in claim 4, wherein an estimation value of the timing offset is expressed as $$\hat{\tau}_{ML} = \underset{\tau}{\operatorname{argmax}}\{|\gamma(\tau)| - \Phi(\tau)\},$$

wherein $\hat{\tau}_{ML}$ represents the estimation value of the timing offset.

6. The method as claimed in claim 4, wherein an estimation value of the frequency offset is expressed as $$\hat{\varepsilon}_{ML} = -\frac{1}{2\pi}\angle\gamma(\hat{\tau}_{ML}),$$

wherein $\hat{\varepsilon}_{ML}$ represents the estimation value of the frequency offset.

7. An apparatus for acquiring synchronization in a mobile communication system using an Orthogonal Frequency Division Multiplexing (OFDM) scheme, the apparatus comprising:
a receiver for receiving a Radio Frequency (RF) signal, converting the received RF signal to a baseband signal, and performing a Fast Fourier Transform (FFT) on the baseband signal; and
a synchronization acquisition unit for inputting the signal for which the FFT has been performed, modeling a power delay profile in time-varying frequency selective fading channel conditions by a specific function, generating a log probability distribution function of a timing offset and a frequency offset using a correlation between an $n^{th}$ sample from samples included in the inputted signal and an $(n+N)^{th}$ sample from samples included in the inputted signal, and estimating, using a maximum likelihood technique, a timing offset and a frequency offset of the $n^{th}$ sample based on the power delay profile and the log probability distribution function, wherein the estimating of the timing offset and the frequency offset is considered within a permissible range of values associated with a number of samples of the received signal.

8. The apparatus as claimed in claim 7, wherein the log probability distribution function includes a correlation part component and an energy part component of the received signal.

9. The apparatus as claimed in claim 7, wherein, when the mobile communication system using the OFDM scheme has $N_{CP}$ number of multi-paths and guard interval signals have a length of the $N_{CP}$, the specific function is expressed as $$\alpha_k = \frac{C}{k},$$

wherein k represents a $k^{th}$ multi-path of the $N_{CP}$ multi-paths and C is a constant expressed as $$C = \sqrt{\frac{1}{\sum_{k=1}^{N_{CP}} k^2}}.$$

10. The apparatus as claimed in claim 9, wherein the log probability distribution function is expressed as $$\Lambda_{2nd}(\tau, \varepsilon) = \frac{2}{\sigma_s^2 + \sigma_w^2}[\text{Re}\{\gamma(\tau)\}\cos(2\pi\varepsilon) - \text{Im}\{\gamma(\tau)\}\sin(2\pi\varepsilon) - \Phi(\tau)]$$
$$= \frac{2}{\sigma_s^2 + \sigma_w^2}[|\gamma(\tau)|\cos(2\pi\varepsilon + \angle\gamma(\tau)) - \Phi(\tau)],$$

wherein $\Lambda_{2nd}(\tau, \varepsilon)$ represents the log probability distribution function, T represents symbol timing offset, $\varepsilon$ represents frequency offset, $\sigma_s^2$ represents average power of transmitted signals $s(\cdot)$, $\sigma_w^2$ represents an average power of Additive White Gaussian Noise (AWGN), and $\gamma(n)$ and the $\Phi(n)$ are respectively expressed as $$\gamma(n) \equiv \sum_{n=\tau}^{\tau+N_{CP}-1} \frac{\rho_n}{1-\rho_n^2} r(n)r^*(n+N),$$

wherein $\rho_n$ represents a correlation coefficient absolute value between the $n^{th}$ sample and the $(n+N)^{th}$ sample of the received signal $r(n)$, and $$\Phi(n) \equiv \frac{1}{2} \sum_{n=\tau}^{\tau+N_{CP}-1} \frac{\rho_n^2}{(1-\rho_n^2)} \{|r(n)|^2 + +|r(n+N)|^2\}.$$

11. The apparatus as claimed in claim 10, wherein an estimation value of the timing offset is expressed as $$\hat{\tau}_{ML} = \underset{\tau}{\operatorname{argmax}}\{|\gamma(\tau)| - \Phi(\tau)\},$$

wherein $\hat{\tau}_{ML}$ represents the estimation value of the timing offset.

12. The apparatus as claimed in claim 10, wherein an estimation value of the frequency offset is expressed as $$\hat{\varepsilon}_{ML} = -\frac{1}{2\pi} \angle \gamma(\hat{\tau}_{ML}),$$

wherein $\hat{\varepsilon}_{ML}$ represents the estimation value of the frequency offset.

13. The method as claimed in claim 1, wherein the power delay profile represents a power profile of a time-varying frequency selective fading channel.

14. The method as claimed in claim 1, wherein the specific function is a square root of an average power in a $k^{th}$ multi-path, and the square root of the average power in the $k^{th}$ multi-path is proportional to an inverse of k, and k is a natural number.

15. The apparatus as claimed in claim 7, wherein the power delay profile represents a power profile of a time-varying frequency selective fading channel.

16. The apparatus as claimed in claim 7, wherein the specific function is a square root of an average power in a $k^{th}$ multi-path, and the square root of the average power in the $k^{th}$ multi-path is proportional to an inverse of k, and k is a natural number.

* * * * *